(12) United States Patent
Russell et al.

(10) Patent No.: US 12,122,477 B2
(45) Date of Patent: Oct. 22, 2024

(54) BICYCLE FRAME WITH ANGLED STRUT

(71) Applicant: Specialized Bicycle Components, Inc., Morgan Hill, CA (US)

(72) Inventors: Douglas Graham Russell, Salinas, CA (US); Eric Robert Fischer, San Jose, CA (US); Chad Nathaniel Price, Aptos, CA (US); Philip Alan Primeaux, Capitola, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 17/381,541

(22) Filed: Jul. 21, 2021

(65) Prior Publication Data

US 2023/0034772 A1 Feb. 2, 2023

(51) Int. Cl.
| | | |
|---|---|---|
| *B62K 3/02* | (2006.01) | |
| *B62K 3/04* | (2006.01) | |
| *B62K 3/06* | (2006.01) | |
| *B62K 19/06* | (2006.01) | |
| *B62K 19/36* | (2006.01) | |

(52) U.S. Cl.
CPC ..................................... *B62K 3/02* (2013.01)

(58) Field of Classification Search
CPC ..... B62J 1/08; B62K 3/02; B62K 3/04; B62K 3/06; B62K 3/08; B62K 19/06; B62K 19/34; B62K 19/36; B62K 19/08
USPC ....... 280/281.1, 274; D12/111, 119
See application file for complete search history.

(56) References Cited

U.S. PATENT DOCUMENTS

| | | | |
|---|---|---|---|
| 4,666,175 | A | 5/1987 | Mueller |
| 4,733,881 | A | 3/1988 | Mueller |
| 4,934,724 | A | 6/1990 | Allsop et al. |
| 5,029,888 | A | 7/1991 | Allsop et al. |
| D343,147 | S | 1/1994 | Cognata et al. |
| D343,600 | S | 1/1994 | Moore |
| 5,284,354 | A | 2/1994 | Mcwethy |

(Continued)

FOREIGN PATENT DOCUMENTS

| | | | |
|---|---|---|---|
| CN | 203581293 U | 5/2014 | |
| CN | 214451585 | * 10/2021 | ............ B62K 19/02 |

(Continued)

OTHER PUBLICATIONS

CN214451585 to Tan, English translation, Oct. 22, 2021 (Year: 2021).*

(Continued)

*Primary Examiner* — Anne Marie M Boehler
(74) *Attorney, Agent, or Firm* — Michael Best & Friedrich LLP

(57) ABSTRACT

A bicycle includes a front wheel and a rear wheel and a frameset supported on the front wheel and the rear wheel. The frameset includes a main frame and a front fork rotationally coupled to the main frame. The main frame includes a top tube, a head tube rotationally supporting the front fork, a down tube coupling the head tube to a bottom bracket, a seat tube extending downward from the top tube and including a lower end spaced from the bottom bracket, a seatstay extending rearward from the lower end of the seat tube, and a strut member extending forward from the lower end of the seat tube and connecting the seat tube to the down tube.

25 Claims, 9 Drawing Sheets

(56) References Cited

U.S. PATENT DOCUMENTS

| | | | |
|---|---|---|---|
| 5,435,584 A * | 7/1995 | Buell | B62K 25/286 |
| | | | 280/285 |
| D405,030 S * | 2/1999 | Frost | D12/111 |
| D419,110 S | 1/2000 | Allen et al. | |
| D419,492 S * | 1/2000 | Egger | D12/111 |
| 6,318,744 B1 | 11/2001 | Lester | |
| 6,789,814 B1 | 9/2004 | Bouloy | |
| 6,848,700 B1 | 2/2005 | Fritschen | |
| 6,889,992 B2 * | 5/2005 | Vroomen | B62K 19/00 |
| | | | 280/281.1 |
| 6,955,372 B1 | 10/2005 | Fritschen | |
| D542,189 S * | 5/2007 | Ellsworth | D12/111 |
| RE40,200 E | 4/2008 | Fritschen | |
| 7,377,534 B2 | 5/2008 | Ellsworth | |
| 7,377,535 B2 | 5/2008 | Chamberlain | |
| 7,516,970 B2 | 4/2009 | Fritschen | |
| D635,894 S | 4/2011 | Argote Vivar | |
| 8,061,729 B2 | 11/2011 | White | |
| 8,439,382 B2 * | 5/2013 | Tortola | B62K 19/06 |
| | | | 280/281.1 |
| 8,439,383 B2 | 5/2013 | Talavasek | |
| D686,950 S | 7/2013 | Lin | |
| D734,218 S | 7/2015 | D'aluisio et al. | |
| 9,469,362 B1 * | 10/2016 | Edmonds | B62K 3/02 |
| D785,509 S | 5/2017 | Juhlin et al. | |
| D801,875 S | 11/2017 | Pfeiffer et al. | |
| 9,963,187 B1 * | 5/2018 | Quan | B62K 19/04 |
| 10,661,855 B2 | 5/2020 | Mcdonald et al. | |
| D885,986 S * | 6/2020 | Chan | D12/111 |
| 10,737,742 B2 | 8/2020 | Soncrant | |
| D906,890 S * | 1/2021 | Duez | D12/111 |
| D908,046 S | 1/2021 | Callahan et al. | |
| D909,921 S | 2/2021 | Stafford et al. | |
| 10,906,609 B2 | 2/2021 | Talavasek et al. | |
| D923,519 S | 6/2021 | Hafner et al. | |
| 11,046,389 B2 | 6/2021 | Talavasek et al. | |
| 11,117,634 B2 | 9/2021 | Talavasek et al. | |
| 11,124,259 B2 | 9/2021 | Talavasek et al. | |
| D939,388 S | 12/2021 | Stafford et al. | |
| D939,389 S | 12/2021 | Stafford et al. | |
| D940,011 S | 1/2022 | Wang et al. | |
| D947,724 S | 4/2022 | Wang et al. | |
| 2002/0038944 A1 | 4/2002 | Lawwill et al. | |
| 2004/0046352 A1 | 3/2004 | Vroomen et al. | |
| 2007/0241532 A1 | 10/2007 | Ellsworth | |
| 2010/0219608 A1 * | 9/2010 | Fioravanti | B62K 25/30 |
| | | | 280/281.1 |
| 2012/0169028 A1 | 7/2012 | Lund et al. | |
| 2014/0042725 A1 | 2/2014 | Lo | |
| 2014/0054873 A1 | 2/2014 | Cocalis | |
| 2015/0001828 A1 | 1/2015 | Silva | |
| 2015/0048586 A1 * | 2/2015 | Choi | B62K 3/02 |
| | | | 280/288.3 |
| 2015/0076789 A1 * | 3/2015 | Singh | B62K 19/06 |
| | | | 280/281.1 |
| 2016/0083037 A1 * | 3/2016 | Chou | B62K 3/04 |
| | | | 280/281.1 |
| 2017/0313376 A1 * | 11/2017 | Prommel | B62K 3/04 |
| 2019/0185100 A1 | 6/2019 | D'aluisio | |
| 2020/0039601 A1 * | 2/2020 | Mcainish | B62K 21/18 |
| 2021/0147032 A1 | 5/2021 | Farrell | |
| 2021/0284269 A1 | 9/2021 | Hu et al. | |
| 2023/0066986 A1 | 3/2023 | Eller | |

FOREIGN PATENT DOCUMENTS

| | | | |
|---|---|---|---|
| DE | 4230987 A1 | 3/1994 | |
| DE | 202015009078 | * 10/2016 | B62K 3/02 |

OTHER PUBLICATIONS

European Patent Office Extended European Search Report for application 22186061.2, dated Nov. 25, 2022 (8 pages).

"Specialized 2022 Fuse M4 Frameset (Light Silver/Brushed Dream Silver/Black)." Performance Bicycle., Dec. 30, 2021 [online], [retrieved on Jan. 12, 2023]. Retrieved from the Internet <URL: https://www.performancebike.com/specialized-2022-fuse-m4-frameset-light-silver-brushed-dream-silver-black-s-76022-7002/p61354949 > (2 pages).

"Specialized P3 Frameset (Satin Olive Green/Black)." Performance Bicycle., Jan. 12, 2022 [online], [retrieved on Jan. 12, 2023]. Retrieved from the Internet <URL: https://www.performancebike.com/specialized-p3-frameset-satin-olive-green-black-22.5-effective-tt-71922-7022/p1339525> (2 pages).

"Race Inc. Retro 26" Bmx Frame (Red) (22")". Performance Bicycle., Jun. 28, 2022 [online], [retrieved on Jan. 12, 2023]. Retrieved from the Internet <URL: https://www.performancebike.com/race-inc.-retro-26-bmx-frame-red-22-ri-fm21al26r-rd/p1374066> (3 pages).

"PRO 29 Hardtail Mountain Bike Frame." Lynskey Titanium Bicycles., Mar. 3, 2018 [online], [retrieved on Jan. 12, 2023]. Retrieved from the Internet <URL: https://lynskeyperformance.com/pro-29-hardtail-mountain-bike-frame/> (2 pages).

GC Performance. Is This the Best Commuter Bike Out? 2024 Specialized Sirrus X 5.0 Carbon. Youtube Video. Publicly Available Apr. 22, 2023. Available online at https://www.youtube.com/watch?v=P0VvqsvY-Fc. (1 page).

Kestrel Bicycles. "1989 Kestrel produces the world's first all carbon triathlon bike, the KM40" Version dated Jun. 21, 2023, available online at https://web.archive.org/web/20210621141655/https://www.kestrelbicycles.com/ (1 page).

Kestrel Bicycles. "1992 Kestrel produces the first modern seat tube less frame, the 500 Sci" Version dated Jun. 21, 2023, available online at https://web.archive.org/web/20210621141655/https://www.kestrelbicycles.com/ (1 page).

* cited by examiner

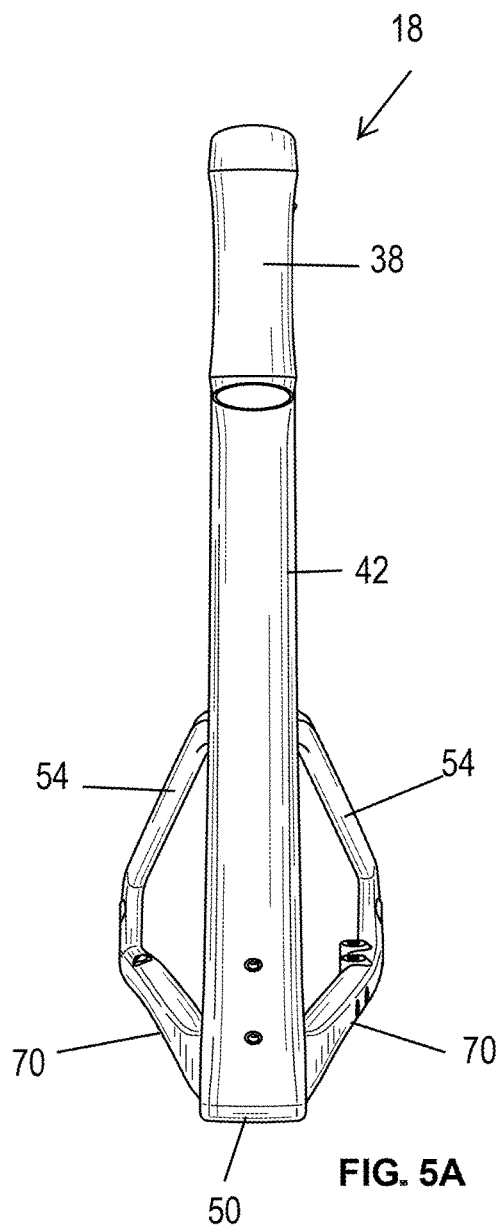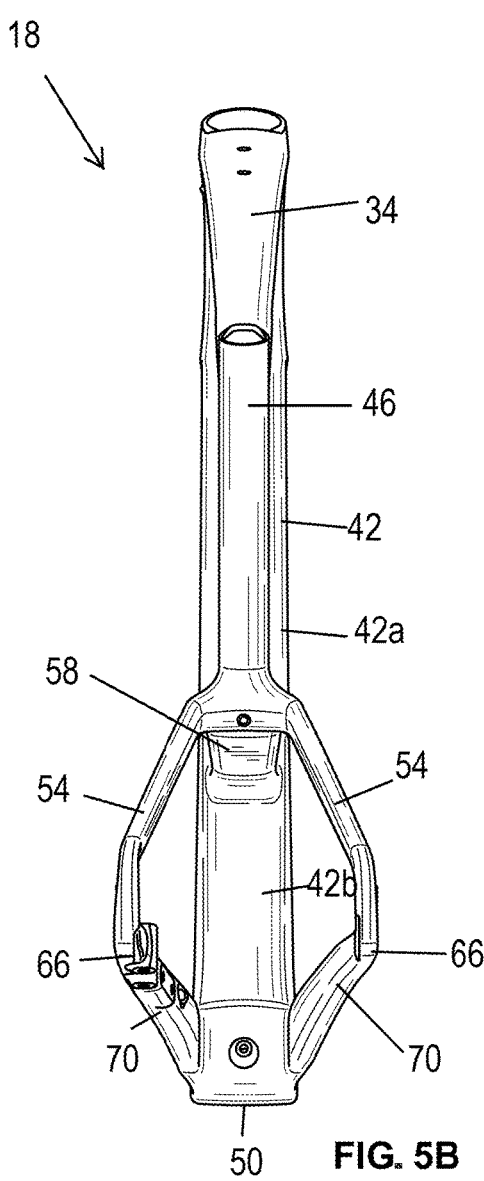
FIG. 5A
FIG. 5B

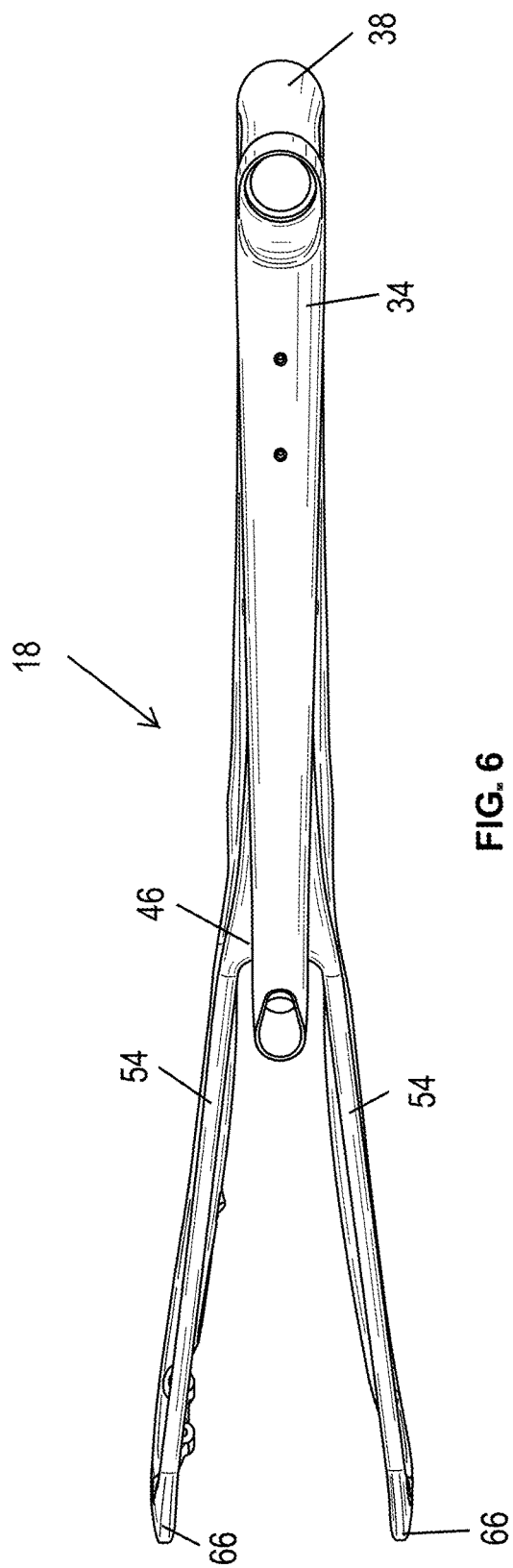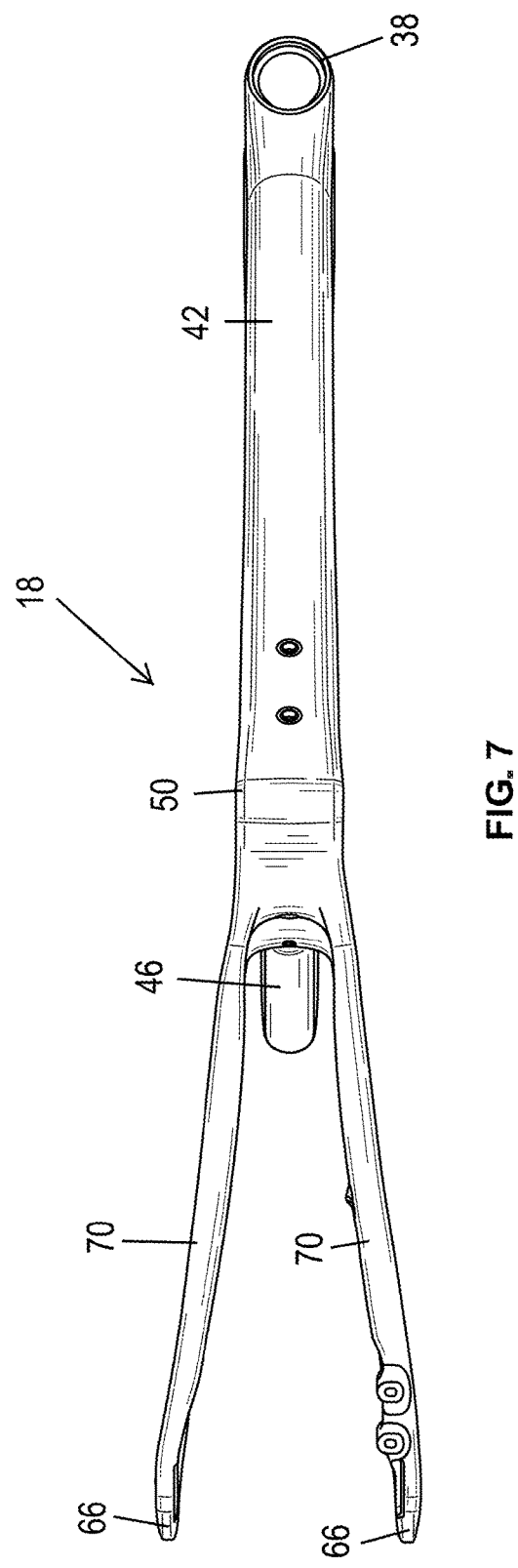
FIG. 6
FIG. 7

BICYCLE FRAME WITH ANGLED STRUT

BACKGROUND

The present disclosure relates generally to the field of bicycles and specifically to a bicycle frame having particular frame member orientation.

Bicycle frames commonly include a frameset including a main frame and a front fork rotationally coupled to the main frame. The main frame typically includes a main triangle and a rear triangle. The main triangle typically includes a top tube, a head tube, a down tube, and a seat tube. The head tube rotationally supports the front fork supported on a front wheel. The rear triangle typically includes a pair of seatstays and a pair of chainstays. Each seatstay is coupled to a corresponding chainstay at a rear dropout that is supported by a rear wheel.

SUMMARY

The present disclosure provides a bicycle. The bicycle includes a front wheel and a rear wheel and a frameset supported on the front wheel and the rear wheel. The frameset includes a main frame and a front fork rotationally coupled to the main frame. The main frame includes a top tube, a head tube rotationally supporting the front fork, a down tube coupling the head tube to a bottom bracket, a seat tube extending downward from the top tube and including a lower end spaced from the bottom bracket, a seatstay extending rearward from the lower end of the seat tube, and a strut member extending forward from the lower end of the seat tube and connecting the seat tube to the down tube.

The present disclosure further provides a frame for a bicycle. The frame includes a top tube, a head tube configured to rotationally support a front fork, a down tube coupling the head tube to a bottom bracket, a seat tube extending downward from the top tube and including a lower end spaced from the bottom bracket, a seatstay extending rearward from the lower end of the seat tube, and a strut member extending forward from the lower end of the seat tube and connecting the seat tube to the down tube.

Other aspects of the disclosure will become apparent by consideration of the detailed description and accompanying drawings.

BRIEF DESCRIPTION OF THE DRAWINGS

FIG. 5A is a front view of the main frame.

FIG. 5B is a rear view of the main frame.

FIG. 6 is a top view of the main frame.

FIG. 7 is a bottom view of the main frame.

DETAILED DESCRIPTION

Before any embodiments are explained in detail, it is to be understood that the present disclosure is not limited in its application to the details of construction and the arrangement of components set forth in the following description or illustrated in the following drawings. The disclosure is capable of other embodiments and of being practiced or of being carried out in various ways.

The use of the terms "above" and "below" refer to relative locations based upon an orientation of the bicycle 10 when the frameset 14 is supported on level ground by the front and rear wheels 26, 30. Additionally, the use of the term "rearward" and "forward" refer to relative locations based upon the standard forward operational direction of the bicycle. Further, the term "tube" refers to an elongated structural member that may or may not be hollow.

Figure 1:
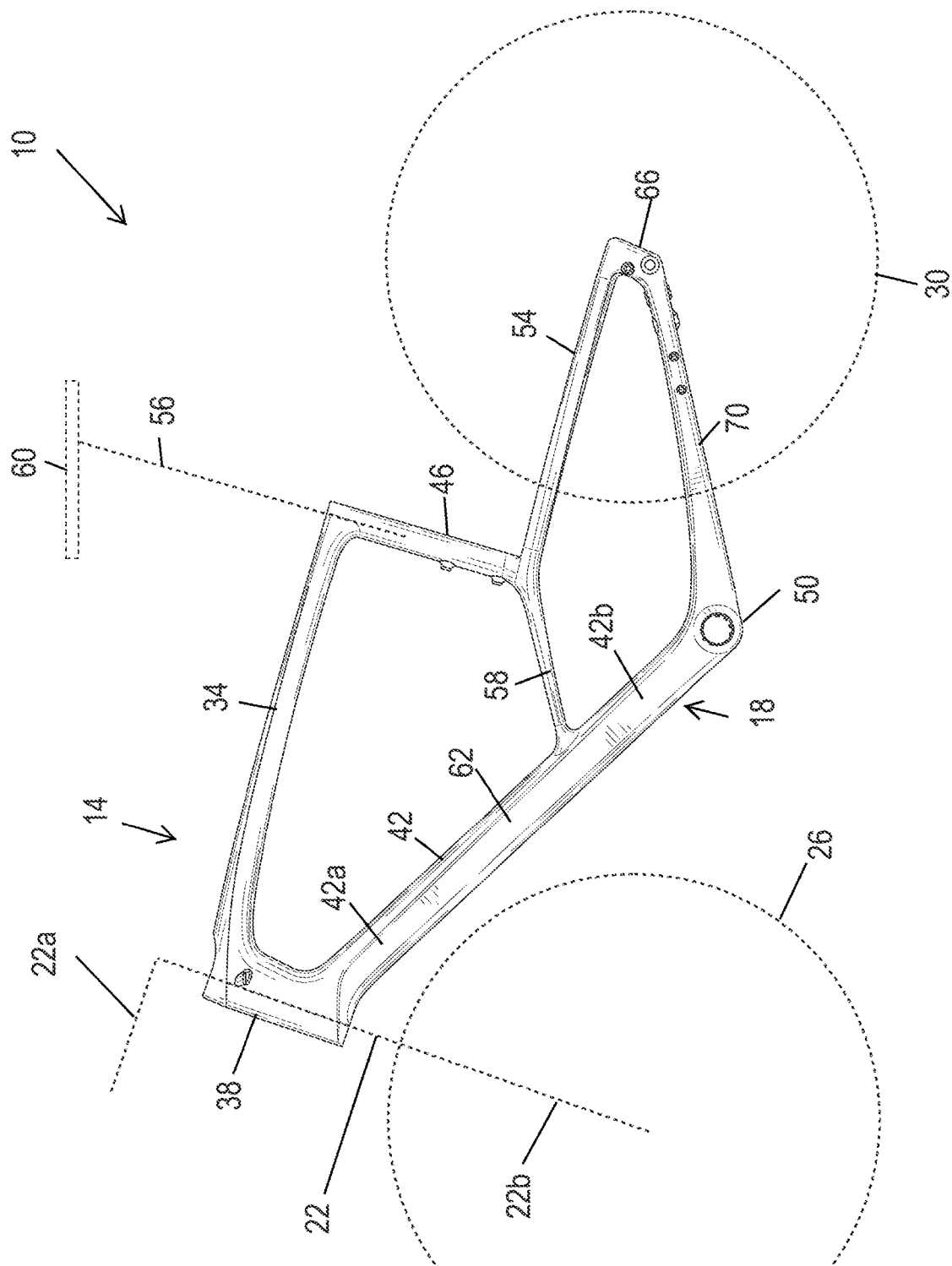
FIG. 1 is a sideview of a bicycle having a main frame.
Figure 2:
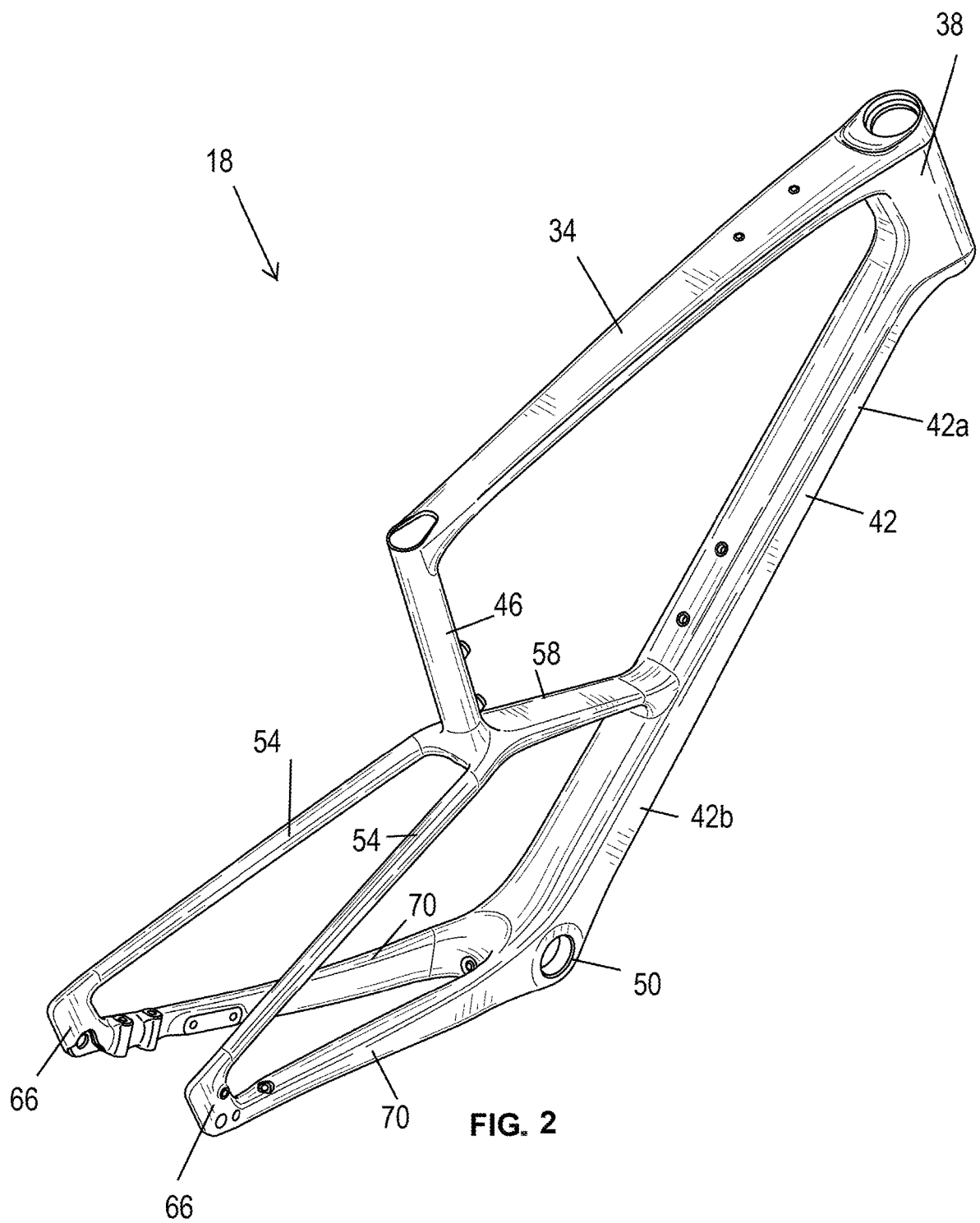
FIG. 2 is a perspective view of the main frame having a strut member.

According to an exemplary embodiment as shown in FIG. 1, a bicycle 10 includes a frameset 14 having a main frame 18 and a front fork 22 rotationally coupled to the main frame 18. The front fork 22 includes handlebars 22*a* at a first (upper) end and a pair of fork ends 22*b* at a second (lower) end. The bicycle additionally includes a front wheel 26 coupled to the front fork 22 at the fork ends 22*b* and a rear wheel 30 coupled to the main frame 18 such that the frameset 14 is supported by the front and rear wheels 26, 30. The main frame 18 is made from, for example, carbon fiber, aluminum, or steel.

As shown in FIGS. 2-7, the main frame 18 includes a head tube 38 extending from a top tube 34 to a down tube 42. The head tube 38 is hollow, defining a central opening through which the front fork 22 extends, with the handlebars 22*a* being positioned above the head tube 38 and the fork ends 22*b* being positioned below the head tube 38.

The top tube 34 extends rearwardly from the upper end of the head tube 38 to a seat tube 46. As shown, the top tube 34 terminates at its rearward end at the top of the seat tube 46. In other embodiments, the top tube 34 may terminate at its rearward end at a location between the upper and lower extents of the seat tube 46 such that the top of the seat tube 34 extends above the rearward end of the top tube 34.

The down tube 42 extends rearwardly from the lower end of the head tube 38 to a bottom bracket 50. The down tube 42 is positioned below the top tube 34 and extends downward from the head tube 38 at greater angle than the top tube 34 such that the distance between the rearward end of the top tube 38 (at the seat tube 46) and the rearward end of the down tube 42 (at the bottom bracket 50) is greater than the distance between the top tube 34 and down tube 42 at the head tube 38. The bottom bracket 50 includes an opening extending therethrough for supporting a pedal assembly.

In contrast to a conventional frame structure having a full seat tube, the seat tube 46 does not extend to the bottom bracket 50 but instead the lower end of the seat tube 46 terminates at a height above the bottom bracket 50. The seat tube 50 extends substantially parallel (e.g., within 10 degrees) to the head tube 38 and extends from the top tube 34 to a location between the top tube 34 and the down tube 42. The seat tube 50 is a hollow tube with an opening at the top end for receiving a seat post 56 that is fastened to a saddle 60. A user may sit on the saddle 60 when operating the bicycle 10.

A strut member or strut tube 58 extends forward from the lower end of the seat tube 46 to the down tube 42. The strut member 58 intersects the down tube 42 at a mid-section 44 of the down tube 42 between the head tube 38 and the bottom bracket 50. In some embodiments, the mid-section 44 of the down tube 42 (i.e., the location where the strut member 58 intersects the down tube 42) is spaced from the bottom bracket a distance that is 15%-60%, 20%-50%, and/or 30%-40% of the length of the down tube 42 (the length of the down tube 42 being the straight line distance from the bottom bracket 50 to where the down tube 42 intersects the head tube 38). In these or other embodiments, the mid-section 44 can be spaced apart from the head tube 38 and bottom bracket 50, and/or can be closer to the bottom backet 50 than to the head tube 38.

The down tube 42 includes a center point 62 equidistant from the ends of the down tube 42 (at the head tube 38 and the bottom bracket 50, respectively). The strut member 58 intersects the down tube 42 at a location nearer the center point 62 than either the bottom bracket 50 or the head tube 38. The embodiment shown in FIG. 1 illustrates that the strut member 58 intersects the down tube at a location between the center point 62 and the bottom bracket 50. The strut member 58 is a portion of the mainframe 18 and can be made of the same material (e.g., carbon fiber, aluminum, steel) as the remainder of the mainframe 18. In other embodiments, the strut member 58 can be a different material than the mainframe 18.

Chainstays 70 extend rearward from the down tube 42 at the bottom bracket 50 on both sides of the rear wheel 30 to a rear dropout 66, where the axle of the rear wheel 30 attaches to the main frame 18. Seatstays 54 extend from the rear dropout 66 on both sides of the rear wheel 30 to the lower end of the seat tube 46 54, thereby intersecting the seat tube 46 at a height above the bottom bracket 50 and below the top tube 34.

Figure 4A:
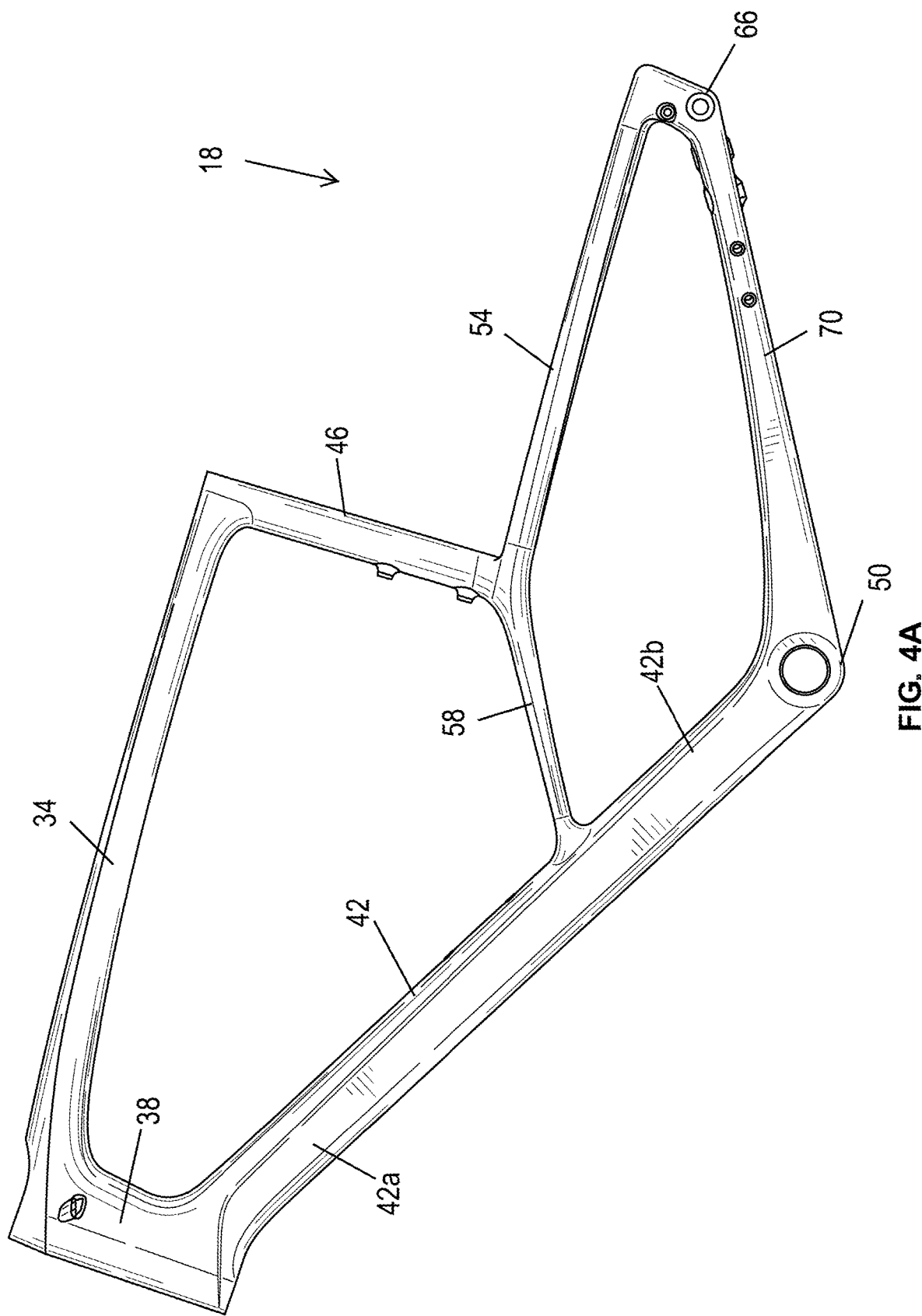
FIG. 4A is a second side view of the main frame.
Figure 4B:
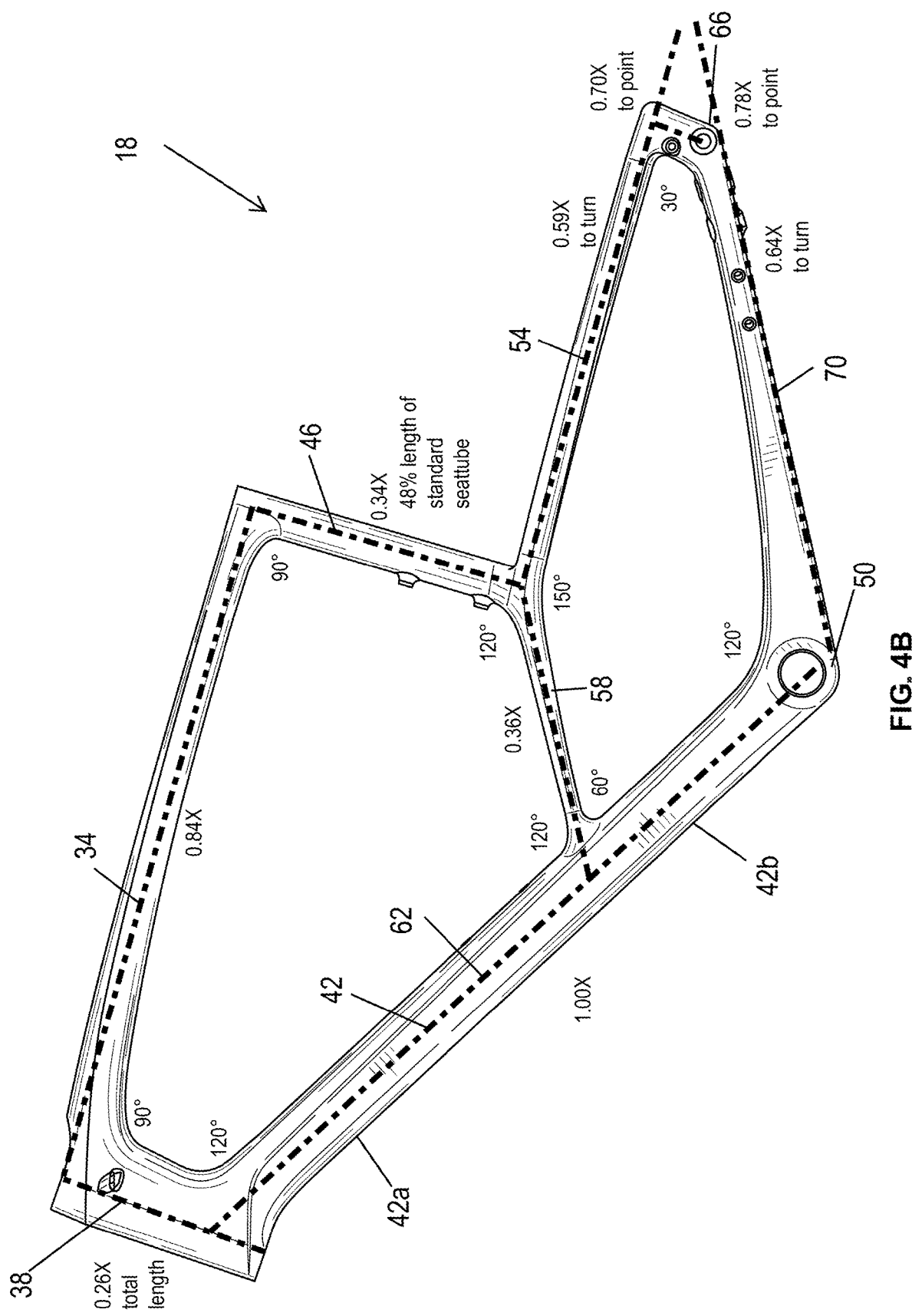
FIG. 4B is the second side view of the main frame illustrating various angles and relative lengths of components.

FIG. 4b illustrates the same components as shown in FIG. 4a, though showing the relative angles and lengths of the components of the mainframe 18. Illustrated angles are approximate and may vary by, for example, ±10, ±20, or ±30 degrees and lengths may vary by, for example, 10 percent of their relative length. As shown, each component is approximated by a straight line between the two ends of the respective component, though the physical component itself may be non-linear (e.g., curved).

The portion commonly referred to as a front triangle in a conventional frame structure having a full seat tube is comprised of five components in the main frame 18: the top tube 34, the head tube 38, a forward portion of the down tube 42a, the seat tube 46, and the strut member 58. The angle between the head tube 38 and the top tube 34 is approximately 90 degrees. Likewise, the angle between the top tube 34 and the seat tube is approximately 90 degrees. The angle between the head tube 38 and the down tube 42, an effective strut angle, is approximately 120 degrees. In some embodiments, an effective strut angle (between the seat tube 46 and the strut member 58) is 90 to 150 degrees, 100 to 140 degrees, and/or 110 to 130 degrees. The angle between the seat tube 46 and the strut member 58 and the angle between the strut member 58 and the forward portion of the down tube 42a are also approximately 120 degrees. In other embodiments, one or more of these angles may be implemented with different angle values.

The portion commonly referred to as a rear triangle in a convention frame structure having a full seat tube is comprised of four components in the main frame 18: the strut member 58, a rearward portion of the down tube 42b, the seatstays 54, and the chainstays 70. The angle between the strut member 58 and the rearward portion of the down tube 42b is approximately 60 degrees such that the supplementary angles between the strut member 58 and the portions of the down tube 42a, 42b total 180 degrees. The angle between the strut member 58 and the seat stays 54 is approximately 150 degrees, which, in combination with the 120 degree angle between the seat tube 46 and the strut member 58, indicates that the seatstays 54 are substantially perpendicular to the seat tube 46 (80-100 degrees). With the seat tube 46 substantially perpendicular to the top tube 34, the seatstays 54 are therefore substantially parallel (−10 to 10 degrees) to the top tube 34. The angle between the rearward portion of the down tube 42b and the chainstays 70 (i.e., at the bottom bracket 50) is approximately 120 degrees, mimicking the angle between the top portion of the down tube 42a and the strut member 58 such that the strut member 58 is substantially parallel to the chainstays 70. Finally, the angle between the chainstays 70 and the seatstays 54 (i.e., at the rear dropout 66) is approximately 30 degrees. In other embodiments, one or more of these angles may be implemented with different angle values.

The absolute lengths of the components of the main frame 18 may be variable and scaled for a rider of a particular height. As such, the lengths of the components are described relative to the longest component, the down tube 42. The down tube 42 is therefore referred to as having a length of 1.00× with the remaining lengths being a percentage of the length of the down tube 42 (e.g., the headtube 38 extends 26% the length of the down tube 42). Exemplary lengths are identified in the following table, though one or more other lengths may be used in other embodiments.

| Component | Relative Length |
| --- | --- |
| Top Tube 34 | 0.84 |
| Head Tube 38 | 0.26 |
| Down Tube 42 | 1.00 |
| Forward Portion of Down Tube 42a | 0.64 |
| Rearward Portion of Down Tube 42b | 0.36 |
| Seat Tube 46 | 0.34 |
| Seatstay 54 | 0.59 |
| Strut Member 58 | 0.36 |
| Chainstay 70 | 0.64 |

As shown, the seat tube 46 is approximately half (e.g., 40%-60%) of the length of a seat tube in a conventional frame structure having a full seat tube that extends to a bottom bracket. Additionally, the strut member 58, the rearward portion of the down tube 42b, and a line drawn between the bottom of the seat tube 46 (where the seat tube 46 intersects the seatstays 54 and the strut member 58) and the bottom bracket 50 forms an equilateral triangle.

Figure 3:
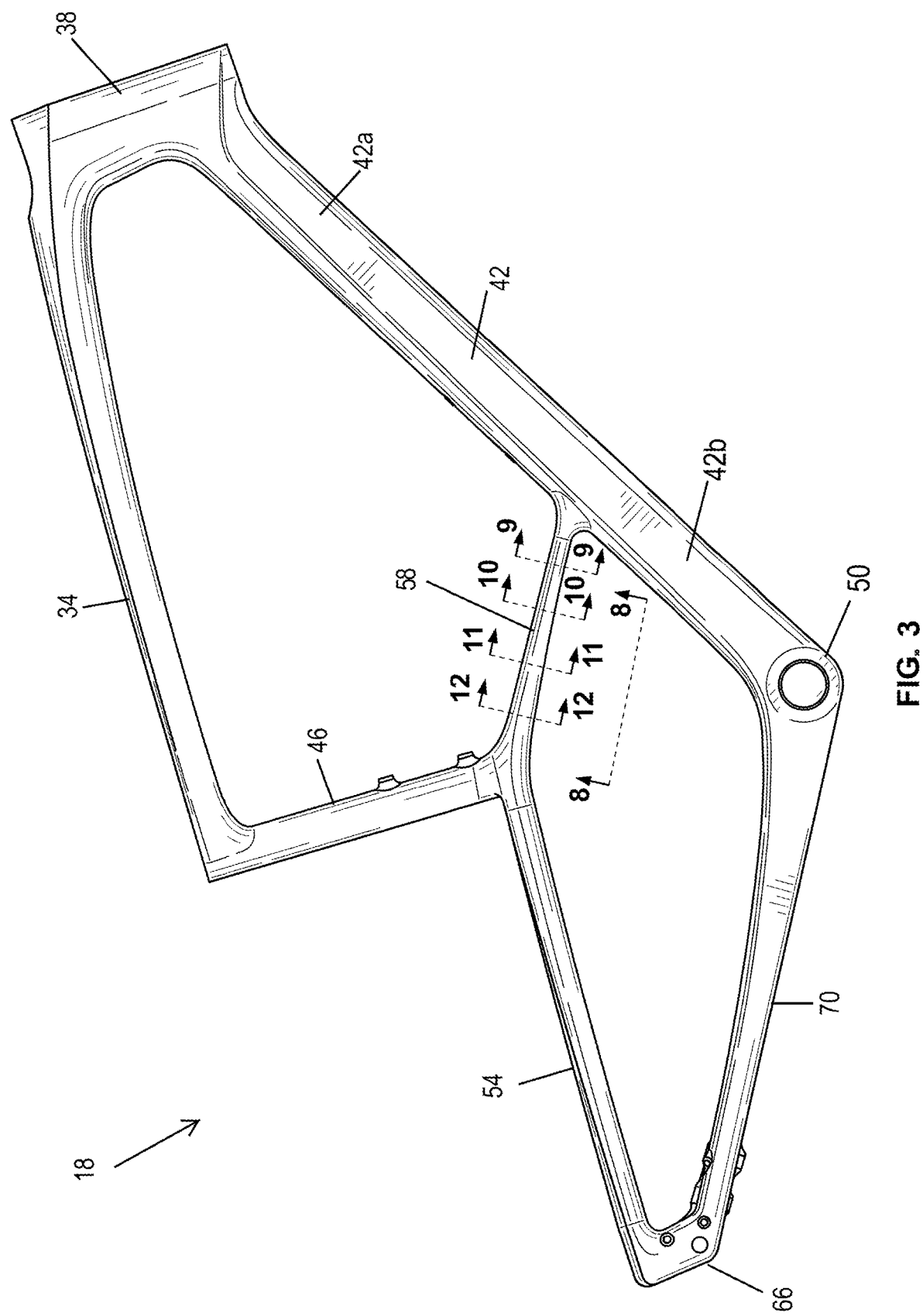
FIG. 3 is a first side view of the main frame having various section lines relating to FIGS. 9-12.
Figure 8:
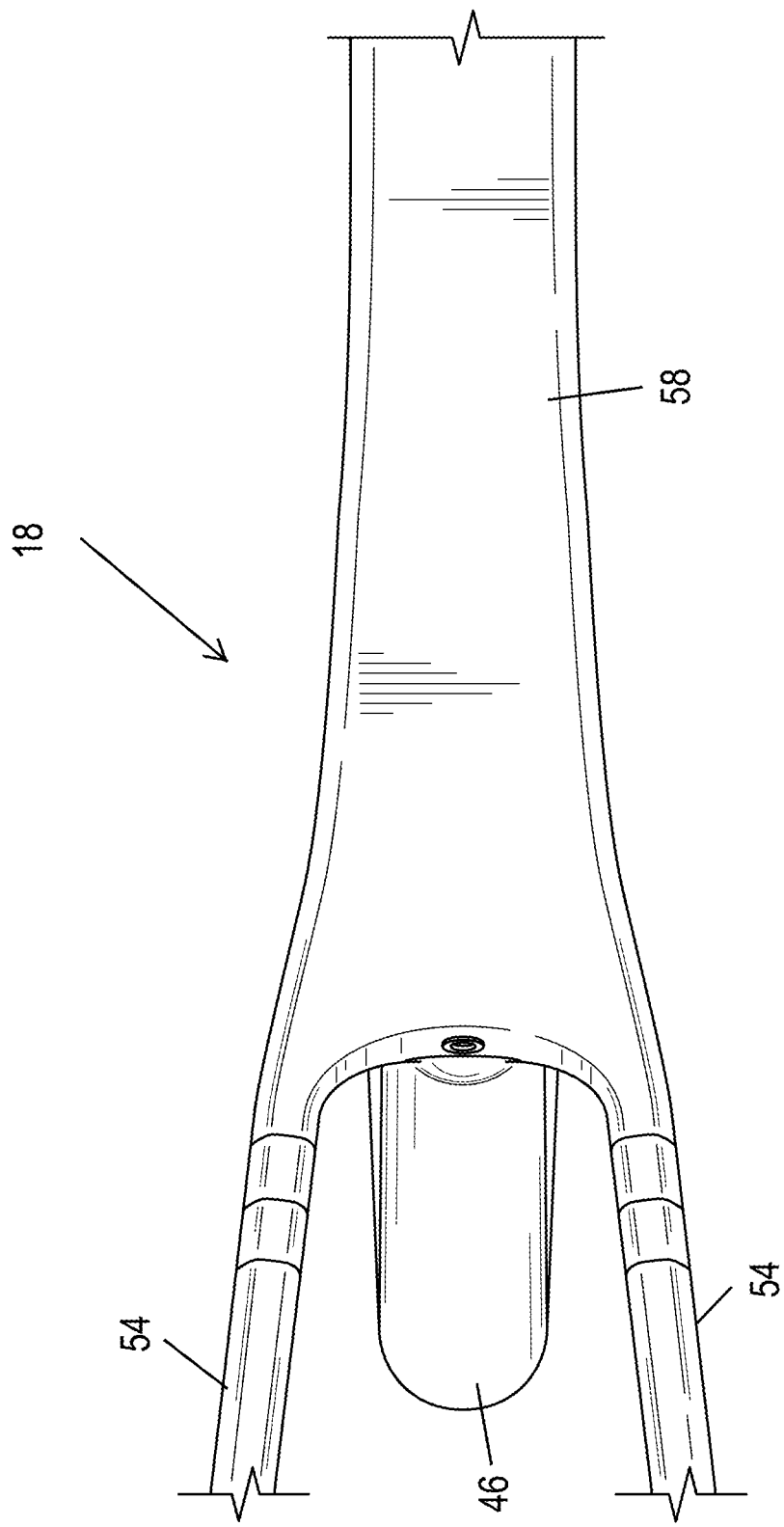
FIG. 8 is a partial perspective view of the main frame below the strut member at an angle normal to the strut member.

FIG. 3 illustrates a side view of the main frame 18 and in particular illustrates the strut member 58, showing the locations of cross-sectional views shown in FIGS. 8-12. FIG. 8 illustrates the strut member 58 from below at an angle normal to the underside of the strut member 58. As shown, the width of the strut member decreases from a rearward end adjacent the seatstays 54 to a forward side adjacent the down tube 42 (FIG. 3). FIG. 3 likewise illustrates that the width of the strut member 58 narrows from the rearward end to the forward end, though flaring out wider again at the forward end to form a soft curving seam at the down tube 42.

Figure 9:
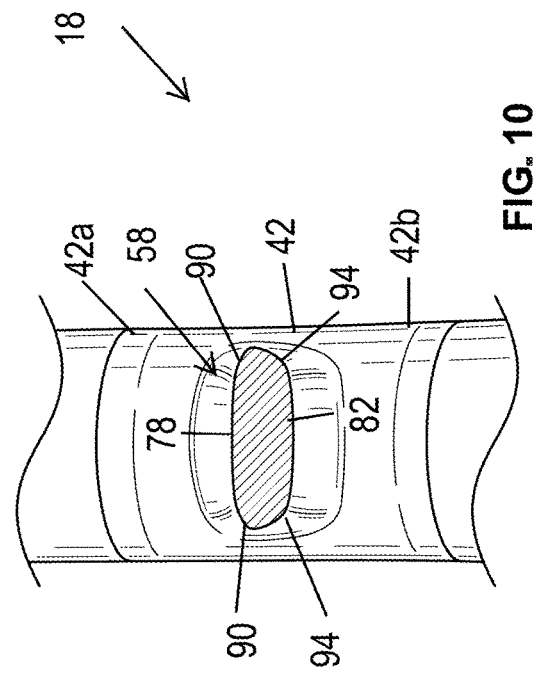
FIG. 9 is a section view of the strut member through section line 9-9.
Figure 10:
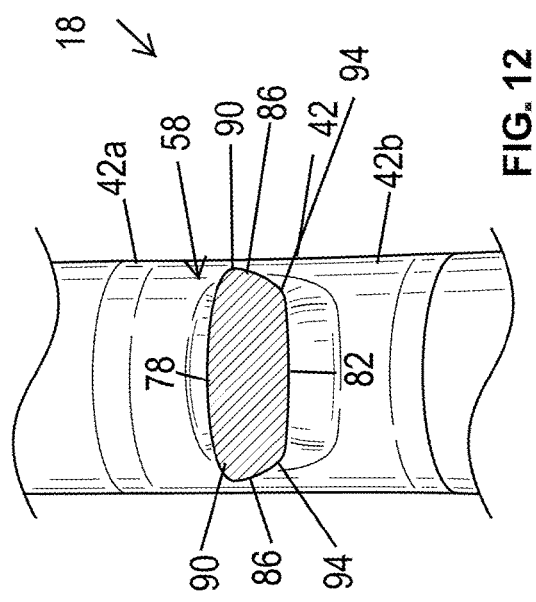
FIG. 10 is a section view of the strut member through section line 10-10.
Figure 11:
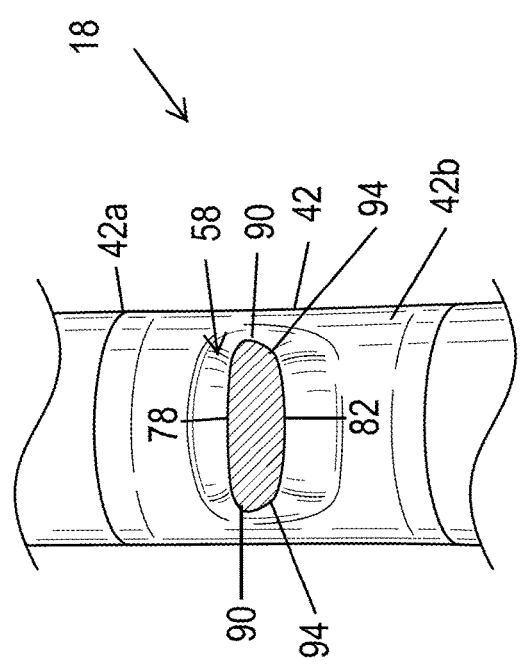
FIG. 11 is a section view of the strut member through section line 11-11.
Figure 12:
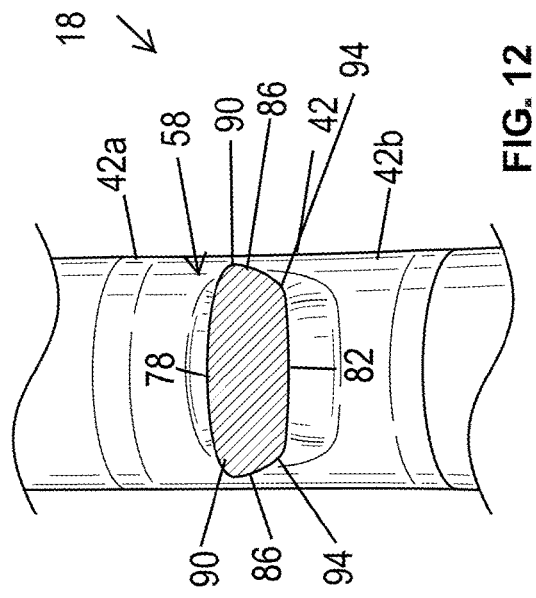
FIG. 12 is a section view of the strut member through section line 12-12.

FIGS. 9-12 illustrate the cross-section of the strut member 58 at various positions along the length of the strut member 58, with FIG. 10 illustrating a cross-section located rearward of the cross-section shown in FIG. 9, FIG. 11 illustrating a cross-section located rearward of the cross-section shown in FIG. 10, and FIG. 12 illustrating a cross-section located rearward of the cross-section shown in FIG. 11. As shown in FIG. 9, the cross-section of the strut member 58 near the down tube 42 (at section line 9-9; see FIG. 3) is a rounded rectangle having a substantially greater width than height. As shown, the width is approximately three times greater than the height of the strut member 58. In some embodiments, a ratio of the width of the strut member relative to the thickness (i.e., the minimum thickness) of the strut member is at least 1.5, 1.8, 2.2, 2.6, and/or 3.0. The width of the strut member 58 is also approximately 70-75% of the width of the down tube 42 at the intersection of the down tube 42 and the strut member 58. The upper and lower surfaces 78, 82 of the strut member 58 are substantially flat and parallel to one another. The corners 90, 94 of the strut member 58 are rounded with the upper corners 90 having a smaller radius than the lower corners 94 such that the maximum width at section line 9-9 is nearer the upper surface 78 than the lower surface 82.

FIG. 10 illustrates the strut member 58 at section line 10-10 (see FIG. 3), which is located rearward of section line 9-9. In comparison to the cross-section shown in FIG. 9, the cross-section shown in FIG. 10 has an increased height and width with each increasing at approximately the same rate such that the width is approximately three times greater than the height of the strut member.

FIG. 11 illustrates the strut member 58 at section line 11-11 (see FIG. 3), which is located rearward of section line 10-10. The height and width are increased relative to the cross-section at 10-10. Having an increased height, the shape of the cross-section shown in FIG. 11 more clearly includes sidewalls 86 (extending between the upper and lower surfaces 78, 82) that are distinct from the rounded corners 90, 94. As shown, the sidewalls 86 are angled outward from the lower surface 82 toward the upper surface 78.

FIG. 12 illustrates the strut member 58 at section line 12-12 (see FIG. 3), which is located rearward of section line 11-11, yet forward of the intersection between the strut member 58, the seat tube 46, and the seatstays 54. The height and width are increased relative to the cross-section at 11-11. The width of the strut member 58 is approximately 95-100% of the width of the down tube 42 at the intersection of the down tube 42 and the strut member 58, which is likewise 95-100% of the width of the seat tube 46. The upper surface 78 of the strut member 58 more distinctly resembles a continuous curved surface such that the outer portions (near the corners 90) are not parallel with the planar lower surface 78.

The main frame 18 excludes a portion of the seat tube 46 that extends to the bottom bracket 50. Additionally, the main frame 18 incorporates the strut member 58 between the intermediate location of the down tube 42 and the intersection of the seat tube 46 and the seatstays 54. These modifications advantageously reduce the vertical stiffness of the bicycle 10 while substantially maintaining or reducing to a lesser extent the horizontal (e.g., lateral and/or torsional) stiffness of the bicycle 10, thereby increasing the comfort for the rider while substantially maintaining or only slightly reducing the handling of the bicycle 10 and/or force transfer of the rider to the bicycle 10.

In comparison to a conventional frame structure having a full seat tube, the main frame 18 of the described embodiment provides reduced vertical stiffness while substantially maintaining or reducing to a lesser extent the horizontal (e.g., lateral and/or torsional) stiffness. These stiffness differences can be seen by testing the force-deflection characteristics using two test simulations: a vertical stiffness test and a horizontal stiffness test. The vertical stiffness test is set up the same as ISO 4210-6:2015-4.5 "Fatigue test with vertical force" (sometimes called the STF test), except rather than a cyclic load, the vertical stiffness test applies a static load of 1200N at the specified location and measures the corresponding x and y deflection at the load location. The horizontal stiffness test is set up the same as ISO 4210-6:2015-4.4 "Fatigue test with horizontal force" (sometimes called the HTF test), except rather than a cyclic load, the horizontal stiffness test applies a static load of 600N at the specified location and measures the corresponding horizontal deflection at the load location. These test simulations were performed on both the disclosed main frame 18 having the strut member 58 and also a conventional frame structure having a full seat tube, both frames being the same size, designed of the same material with the same wall thickness and same tube shape and diameter. The results of the tests are set forth in the following table.

|  | Conventional Frame | Main Frame 18 with Strut |
| --- | --- | --- |
| Vertical Stiffness Test vertical (y) deflection | 2.9 mm | 7.9 mm |
| Vertical Stiffness Test horizontal (x) deflection | 4.1 mm | 7.2 mm |
| Horizontal Stiffness Test horizontal deflection | 6.7 mm | 5.1 mm |

As reflected in the test results, the main frame 18 produced 172% greater vertical deflection and 75% greater horizontal deflection at the seat during the vertical stiffness test compared to the conventional frame. By increasing the vertical deflection at a greater rate than the horizontal deflection, ride comfort is increased without substantially increasing the rearward saddle tilt. The horizontal stiffness test showed a decrease of 24% in the horizontal deflection for the main frame 18 compared to the conventional frame, which does not substantially impact the ride characteristics (e.g., handling, force transfer, etc.), but it provides evidence that the frame design works well to handle the loads/stresses applied during the horizontal stiffness test, which is believed to correlate to real-world riding.

Various features of the disclosure are set forth in the following claims.

The invention claimed is:

1. A bicycle comprising:
a front wheel and a rear wheel;
a frameset supported on the front wheel and the rear wheel, the frameset comprising a main frame and a front fork rotationally coupled to the main frame, the main frame comprising:
a top tube;
a head tube rotationally supporting the front fork;
a down tube coupling the head tube to a bottom bracket;
a seat tube extending downward from the top tube and including a lower end spaced from the bottom bracket, wherein the seat tube includes an opening at an upper end of the seat tube configured to receive a seat post, wherein a seat tube axis extends centrally down through the opening and to the lower end of the seat tube;
a seatstay extending rearward from the lower end of the seat tube;

a chainstay; and a strut member extending forward from the lower end of the seat tube and connecting the seat tube to a mid-section of the down tube;

wherein the top tube extends from the seat tube to the head tube, wherein the top tube is spaced apart from the down tube, wherein both the strut member and the seatstay are spaced apart from the top tube, and wherein the seat tube axis extends to a point of intersection between the seat tube, the seatstay, and the strut member.

2. The bicycle as claimed in claim 1, wherein the down tube has a length, and wherein the strut member connects to the down tube at the mid-section of the down tube that is spaced from the bottom bracket a distance that is 15%-60% of the length of the down tube.

3. The bicycle as claimed in claim 2, wherein the distance is 20%-50% of the distance from the bottom bracket to the head tube.

4. The bicycle as claimed in claim 2, wherein the distance is 30%-40% of the distance from the bottom bracket to the head tube.

5. The bicycle as claimed in claim 1, wherein the strut member defines an effective strut angle that is 90 to 150 degrees relative to the seat tube.

6. The bicycle as claimed in claim 5, wherein the strut member has a width perpendicular to a center plane that extends along a length of the bicycle between the front wheel and the rear wheel, and a thickness perpendicular to the width and in the center plane, and wherein a portion of the strut member has a width:thickness ratio of at least 1.5.

7. The bicycle as claimed in claim 6, wherein the width:thickness ratio is at least 1.8.

8. The bicycle as claimed in claim 6, wherein the width:thickness ratio is at least 2.2.

9. The bicycle as claimed in claim 1, wherein the strut member defines an effective strut angle that is 100 to 140 degrees relative to the seat tube.

10. The bicycle as claimed in claim 1, wherein the strut member defines an effective strut angle that is 110 to 130 degrees relative to the seat tube.

11. The bicycle as claimed in claim 1, wherein the strut member defines an effective strut angle relative to the down tube, and wherein the chainstay defines an effective chainstay angle relative to the down tube that is within 10 degrees of the effective strut angle.

12. The bicycle as claimed in claim 1, further comprising the seat post positioned at least partially within the seat tube, wherein the seat post extends along the seat tube axis.

13. A frame for a bicycle comprising:

a top tube;

a head tube configured to rotationally support a front fork;

a bottom bracket;

a down tube coupling the head tube to the bottom bracket;

a seat tube extending downward from the top tube and including a lower end spaced from the bottom bracket, wherein the seat tube includes an opening at an upper end of the seat tube configured to receive a seat post, wherein a seat tube axis extends centrally down through the opening and to the lower end of the seat tube;

a seatstay extending rearward from the lower end of the seat tube;

a chainstay; and a strut member extending forward from the lower end of the seat tube and connecting the seat tube to a mid-section of the down tube;

wherein the top tube extends from the seat tube to the head tube, wherein the top tube is spaced apart from the down tube, wherein both the strut member and the seatstay are spaced apart from the top tube, and wherein the seat tube axis extends to a point of intersection between the seat tube, the seatstay, and the strut member.

14. The frame as claimed in claim 13, wherein the strut member connects to the down tube at the mid-section of the down tube that is spaced from the bottom bracket a distance that is 30%-40% of the distance from the bottom bracket to the head tube.

15. The frame as claimed in claim 13, wherein the strut member defines an effective strut angle that is 110 to 130 degrees relative to the seat tube.

16. The frame as claimed in claim 13, wherein the strut member defines an effective strut angle relative to the down tube, and wherein the chainstay defines an effective chainstay angle relative to the down tube that is within 10 degrees of the effective strut angle.

17. The frame as claimed in claim 16, wherein the strut member has a width perpendicular to a center plane that extends along a length of the bicycle between the front wheel and the rear wheel, and a thickness perpendicular to the width and in the center plane, and wherein a portion of the strut member has a width:thickness ratio of at least 3.0.

18. The frame as claimed in claim 13, wherein the seat tube extends downward from the top tube toward the bottom bracket, and wherein the lower end of the seat tube is located at a position that is 40%-60% of a distance defined between the bottom bracket and an intersection of the seat tube and the top tube.

19. The frame as claimed in claim 13, wherein the seatstay extends rearward from the lower end of the seat tube substantially perpendicular to the seat tube.

20. The frame as claimed in claim 13, wherein the top tube is non-linear.

21. The frame as claimed in claim 13, wherein the chainstay extends substantially parallel to the strut member, and wherein the seatstay extends substantially parallel to the top tube.

22. The frame as claimed in claim 13, where the bottom bracket is positioned between the chainstay and the down tube, and the chainstay extends rearward from the bottom bracket.

23. The frame as claimed in claim 13, wherein the seat tube intersects the top tube at approximately 90 degrees, wherein the seat tube intersects the seatstay at approximately 90 degrees, wherein the seat tube intersects the strut member at between 110 and 130 degrees, and wherein the chainstay extends substantially parallel to the strut member.

24. The frame as claimed in claim 13, wherein the strut member includes a first terminal end and a second, opposite terminal end, wherein the first terminal end is fixed to the seat tube and the second terminal end is fixed to the down tube.

25. The frame as claimed in claim 13, wherein the strut member directly connects the seat tube to the down tube.

* * * * *